Oct. 15, 1940.   T. H. SWAN ET AL   2,218,387
FUSED COLLAR
Filed Nov. 20, 1937   2 Sheets-Sheet 1
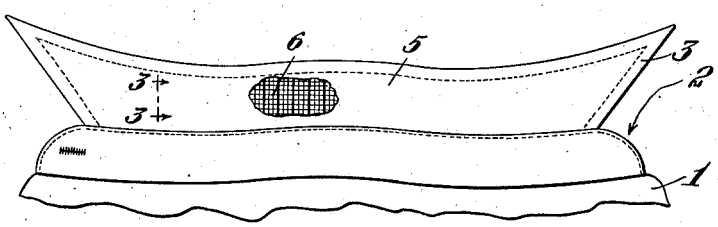
Fig. 1
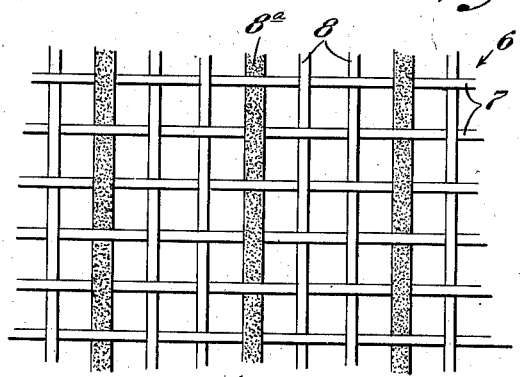
Fig. 2
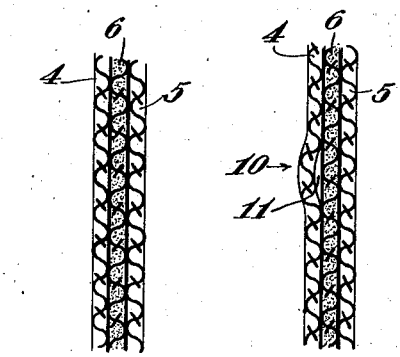
Fig. 3   Fig. 3ª
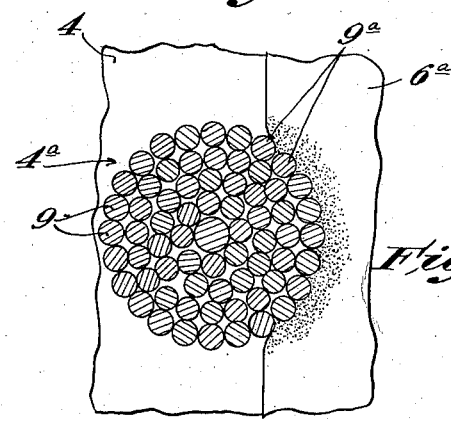
Fig. 4
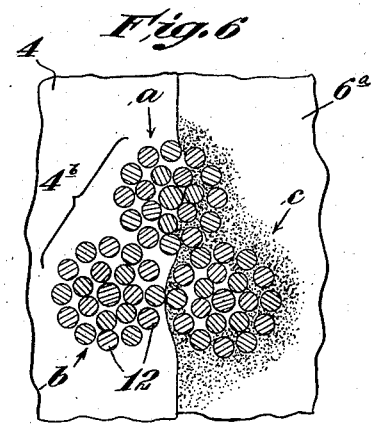
Fig. 6
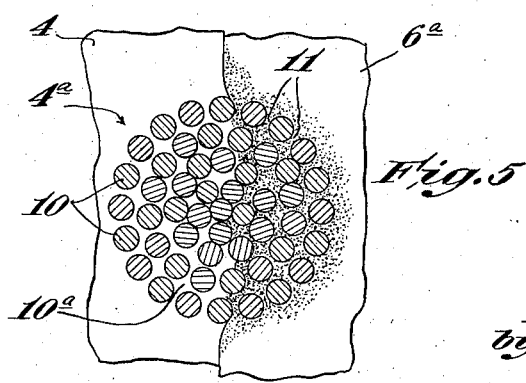
Fig. 5
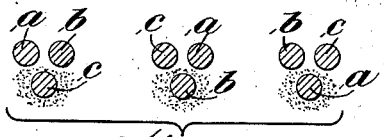
Fig. 6ª
Inventors
Thomas H. Swan
Harry C. Donaldson Jr.
by Roberts Cushman & Woodberry
Att'ys.

Oct. 15, 1940.   T. H. SWAN ET AL   2,218,387
FUSED COLLAR
Filed Nov. 20, 1937   2 Sheets-Sheet 2
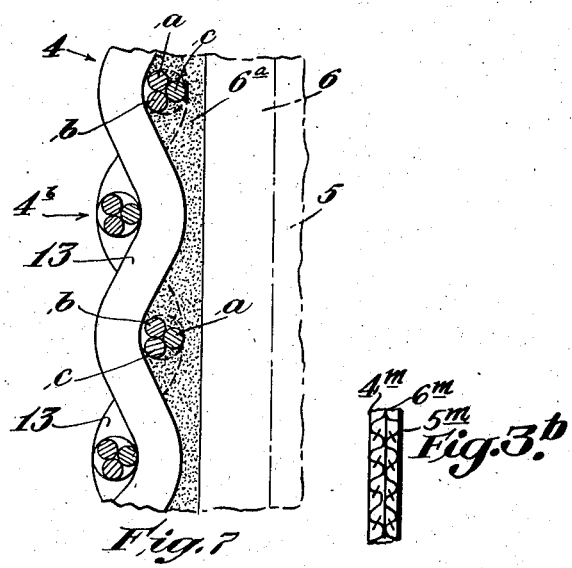
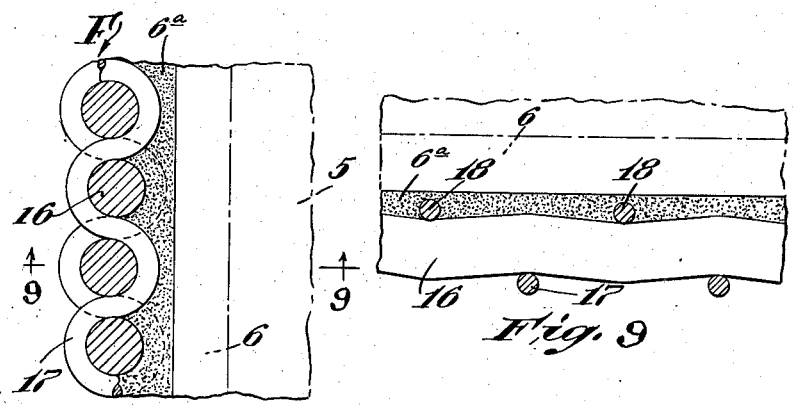
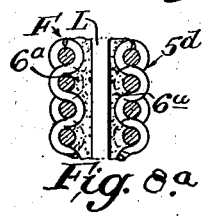
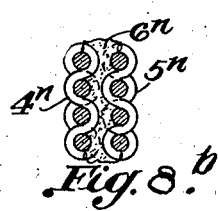
Inventors
Thomas H. Swan
Harry C. Donaldson Jr.
by Roberts Cushman & Woodberry
Att'ys.

Patented Oct. 15, 1940

2,218,387

UNITED STATES PATENT OFFICE 2,218,387

FUSED COLLAR

Thomas H. Swan, Troy, and Harry C. Donaldson, Jr., Brunswick, N. Y., assignors to Cluett, Peabody & Co., Inc., Troy, N. Y., a corporation of New York Application November 20, 1937, Serial No. 175,690

7 Claims. (Cl. 154—46)

This invention pertains to garments, for example, collars or cuffs, as well as to other articles in which constituent plies are adhesively united and stiffened by fusion of a normally dry or substantially non-sticky bonding substance present as an adherent part of the article structure prior to the fusing operation. The union of the plies of a collar or the like by fusion is fully disclosed in the patent to Liebowitz No. 1,968,410, granted July 31, 1934; and in the copending application of Thomas H. Swan for Letters Patent, Serial No. 5,105, filed February 5, 1935.

It is essential to the manufacture of acceptable collars, cuffs, shirts, etc., that the material or materials employed in stiffening the article be of such character and so incorporated that the appearance and feel of the exposed surface of the finished article is not appreciably different from that of a similar article stiffened by laundry starching. For this reason the fusing process contemplates the employment of an adhesive supplied in substantially the minimum amount capable of causing the plies to adhere and of imparting the desired stiffness,—since any excess of the adhesive material tends to exude through the interstices of the facing ply and to appear at the outer surface of the latter in the form of spots, unduly high gloss, or other undesirable effects.

As a preliminary to the fusing process, the article to be fused, hereinafter for convenience, but without limiting intent, referred to as a "collar," may be made to include an interliner ply consisting of a textile fabric, usually woven and usually predominantly of cotton or linen yarn, but having interspersed therein, at spaced intervals, synthetic yarns, for example warp yarns made from a bonding medium capable of becoming sticky when subjected to suitable treatment and of thereafter again resuming a dry and stiff phase. After the article has been put through the fusing process, these synthetic yarns remain behind, no longer as distinct strands, but rather as a more or less checkered or discontinuous film adhesively binding the facing or outer ply to the cotton or linen yarns of the interliner. Whereas the bonding medium suggested by Liebowitz is cellulose acetate, or the like, which must be treated with a solvent as a step in the fusing operation, Swan, in his copending application above referred to, suggests the use of a bonding medium of thermoplastic nature, for example a synthetic resin such as a vinyl polymer, capable of effecting bonding under the action of heat and pressure only.

For the outer or facing ply of the collar it has been customary to employ a fine cotton or linen fabric, for example, broadcloth, woven from warp and weft yarns of small diameter, such as 40's cotton, hard twisted or spun, and in a close, usually one-and-one weave, with, for example, 136 warp ends and 60 filling ends per inch. After finishing, such a material has a hard, smooth and somewhat glossy surface.

Unlike the ordinary starched collar, which at frequent intervals, to wit, at each laundering, receives a fresh supply of stiffening and adhesive material in the form of starch, a collar of the fused and self-stiffened type is expected to preserve, throughout its normal life, the stiffness imparted to it during manufacture. As already noted, the amount of stiffening adhesive material which may permissibly be supplied during manufacture is quite limited, and it has been observed that many collars of the fused type, long before the outer ply fabric has actually begun to show signs of wear, loses its stiffness, there being a marked tendency for the outer ply to separate from the interliner, forming bubbles or blisters, indicative of failure of the adhesive firmly and permanently to consolidate the several plies.

Microscopic examination of the material of a collar in which such blistering or separation has been observed shows that the adhesive derived from the synthetic yarns of the interliner during the fusing process has failed at such points to find a secure anchorage to the inner surface of the facing ply, such surface, as already noted, commonly being hard, non-absorbent and comparatively smooth, its constituent yarns individually being substantially cylindrical and both warp and filling yarns forming low undulations at the surface of the fabric where they pass over the yarns of the other set, with each yarn nested in the concavity of a bight of the crossing yarn.

A principal object of the present invention is to provide a new method of procedure and a novel collar structure resulting therefrom wherein the adhesive material, supplied by the interliner during the fusing process, is securely and firmly anchored to the inner surface of the outer ply.

As already noted, the fusing process must not result in changing the external appearance of the completed collar, as compared with that of the ordinary laundry starched collar, and likewise it is not permissible, in the making of a fused collar, to employ an outer ply material which, to the wearer, is substantially different in external appearance from the materials, for example cotton or linen broadcloth, commonly employed for such purpose. Accordingly, a further object of the invention is to provide an improved collar structure and method of making the same wherein and whereby the outer or facing ply may have an external appearance acceptable to the trade but of a structure such as, at its inner surface, to provide firm and adequate anchorage for the adhesive element of the interliner.

Other objects and advantages of the invention will be made manifest in the following more detailed description and by reference to the accompanying drawings, wherein:

Fig. 1 is a rear elevation of a completed collar of the fused type such as that to which the present invention relates, the collar being unfolded and having a portion of its rear ply broken away to show the interior construction;

Fig. 2 is a diagrammatic plan view, to enlarged scale, illustrating fusible interliner material of one of the kinds commonly employed in the manufacture of such collars;

Fig. 3 is a more or less diagrammatic, fragmentary section to large scale, substantially on the line 3—3 of Fig. 1, showing the several plies of the collar properly adhered together;

Fig. 3a is a view similar to Fig. 3 but showing an effect resulting from the failure of the adhesive on the interliner to stick firmly to the inner surface of the outer or facing ply;

Fig. 3b is a view similar to Fig. 3 but illustrating a two-ply fabric;

Fig. 4 is a diagrammatic section illustrative of the appearance of a portion of usual multi-ply collar fabric under the microscope and illustrative of one of the reasons for the failure of the adhesive properly to unite the facing ply to the interliner;

Fig. 5 is a view similar to Fig. 4, but illustrative of the ideal condition which it would be desirable to obtain;

Fig. 6 is a view similar to Fig. 5 illustrative of one embodiment of the present invention designed to obtain a firm anchorage between the interliner and the outer ply;

Fig. 6a is a diagrammatic view illustrating the effect of using a three-strand yarn in the facing ply;

Fig. 7 is a fragmentary diagrammatic section, to much smaller scale than Fig. 6, showing the outer ply and the interliner secured together, the outer ply having constituent yarns of the type shown to larger scale in Fig. 6;

Fig. 8 is a section showing another and preferred form of facing ply material also embodying the present invention.

Fig. 8a is a view generally similar to Fig. 8, but showing both front and rear plies as provided with anchorage elements;

Fig. 8b is a view similar to Fig. 8a but illustrating a two-ply fabric; and

Fig. 9 is a section on the line 9—9 of Fig. 8.

Referring to the drawings, Fig. 1 illustrates the invention by way of example as embodied in a self-stiffened shirt collar, although it is to be understood that the invention is not necessarily limited in its applicability to shirt collars, but is desirable whenever constituent plies of a garment or garment part are to be united by fusion by the use of substances such as described in the aforesaid patent to Liebowitz, or in the copending application of Swan, above referred to. In Fig. 1 the collar is shown as permanently attached to the upper part of a shirt 1, the collar comprising the band portion 2 and the top 3.

The top, as here illustrated, comprises the facing ply 4 (Fig. 4) the back or rear ply 5 and the lining ply or interliner 6. This interliner 6 is of a type having inclusions of normally dry or substantially non-sticky cementitious material which may be caused to become adhesive at the proper stage in the manufacture of the collar, thereby to unite the plies and to impart the desired degree of stiffness, it being noted, however, that this cementitious material is of a waterproof or water-resistant type and designed to form a permanent part of the collar as distinguished from such a stiffening material as starch, which must be renewed at every laundering. As a suitable interliner material, a fabric generally similar to that disclosed in the Liebowitz patent above referred to has been selected by way of example. This fabric, as diagrammatically shown in Fig. 2, is a woven web which comprises the normal weft threads 7 of natural textile fiber, for example cotton, silk or the like, and the normal warp threads 8 also usually of some natural textile fiber such as cotton but having interspersed between these normal warp threads special warp threads 8a of a synthetic substance, such, for example, as a cellulose derivative, synthetic resin or the like, which is normally dry and non-adhesive but which may be made adhesive after assembly of the interlining with the other plies of the garment by treatment with a solvent or other suitable means, whereupon such special warp threads 8a partially or wholly dissolve or soften, forming an adhesive film or layer which in setting is designed to unite the several plies of the collar in a permanent manner and impart the desired stiffness.

Referring to Fig. 4, which is a more or less diagrammatic cross-sectional view showing a single ordinary filling yarn of the facing ply or web and a portion of the adhesive film resulting from the treatment of the special warp threads of the interliner, and wherein the parts are shown to greatly enlarged scale, the adhesive film is indicated at 6a and the single filling yarn at 4a, such yarn consisting of a bundle of individual fibers 9 suitably associated as by spinning to form a continuous strand. In accordance with the usual methods of weaving the material which is to be used for the facing ply, the yarns 9 are hard twisted and the fabric formed from these yarns is closely woven so as to give the desired smooth and finished surface appearance to the facing ply. As above stated, it has been found, however, that when the facing ply is made of this smooth, finished, dense and compact material, of which cotton broadcloth may be cited as a good example, the finished collar shows a marked tendency, after a short period of use and after a few launderings, to blister, as indicated at 10 in Fig. 3a, due to the separation, as indicated at 11, of the facing ply from the interliner. It may here be repeated that it is essential to the commercial acceptability of collars made by the fusing process that the outer surface of the facing ply of the completed collar have substantially the same appearance, feel and finish as the surface of an ordinary starched laundered collar, and for this reason it is necessary to limit the amount of adhesive employed so that, during the fusing operation, it can not exude through the interstices of the facing ply and thus appear in the form of shiny spots at the outer surface. However, when the maximum permissible amount of adhesive is used in an interliner such as that of Fig. 2, it is found that blisters 10 quite frequently appear in the collar after use, and that the life of the collar is thus very seriously shortened. One of the reasons for this effect is indicated diagrammatically in Fig. 4 wherein it is shown that the constituent fibers 9 of the yarn 4ᵃ are closely crowded together at the periphery of the yarn, so that those fibers 9ᵃ, for example, which are exposed to the adhesive forming the layer 6ᵃ, mutually exclude the adhesive from entrance into the substance of the yarn. The adhesive thus only touches the substantially smooth and hard peripheral surface of the yarn and obtains little real anchorage. Thus when the collar undergoes flexing during laundering there is a tendency for the adhesive layer to break away from the hard smooth surfaces of the yarns, thus releasing the facing ply so that blisters form.

An ideal condition is that represented in Fig. 5, wherein the yarn 4ᵃ is shown as comprising a large number of constituent fibers 10 which in this instance are separated so that substantial interstices are left between them, as shown at 10ᵃ, into which the plastic adhesive may readily enter so as to penetrate into the substance of the yarn and more or less completely to surround the individual fibers. However, this ideal condition can not well be realized in the manufacture of such fabrics as are acceptable for use in the finer grades at least of collars, cuffs or the like, since the trade demands a fine close firm weave structure, the exposed outer surface at least of the facing ply consisting of yarns of small diameter, such as to afford the fine finish commonly demanded in such articles. The use of loose and open yarns in the facing ply is thus precluded as a practical matter, except possibly for some special and relatively less important types of garment.

In accordance with the present invention, results substantially equivalent to that indicated in Fig. 5, that is to say, the firm and permanent anchorage of the facing ply to the interliner, may be secured by practical and commercial methods and without sacrificing the desired fine appearance of the outer surface of the facing ply. In accordance with one embodiment of the invention, as illustrated in Figs. 6, 6ᵃ and 7, for example, certain of the yarns used in the facing ply, for example, each weft yarn (although the warp yarns or both warp and weft, if desired, may be of similar type) consists of a plurality of independent spun strands twisted together in accordance with well known methods to form the yarns which are used in weaving the facing ply material. While it is contemplated that these multi-strand yarns may consist of two or any greater number of individually spun strands twisted together, the arrangement illustrated in Figs. 6, 6ᵃ, and 7 contemplates the employment of filling yarns 4ᵇ, each consisting of three strands $a$, $b$ and $c$, each spun from a plurality of individual fibers 12 (Fig. 6). These filling yarns, as shown in Fig. 7, are interwoven with warp yarns 13 which may be single strand yarns if desired, or which may be multi-strand yarns like the filling yarns, if preferred. Or on the other hand, the warp yarns may be of the multi-strand type and the filling yarns of single strand type. Whatever arrangement be employed it may be noted by reference to Figs. 6 and 6ᵃ that at the inner face of this ply (which is exposed to the layer 6ᵃ of cementitious material) certain of the helical bights of each of the strands $a$, $b$ and $c$ successively will stand out from the surface of the fabric so that the adhesive material is able substantially to surround such projecting helical bight. Thus as shown in Fig. 6, a portion of the strand $c$ is nearly surrounded by the adhesive material, at least more than 180° of its periphery being free to contact with the adhesive. As shown in Fig. 6ᵃ, at successive transverse sections of the yarn 4ᵇ, bights of the strands $c$, $b$ and $a$, respectively, will thus be exposed at the inner side of the ply so as to be firmly embedded and anchored in the adhesive substance. Such an arrangement affords a very permanent union between the interliner ply, and the facing ply and it is found in practice that such an arrangement very markedly reduces the tendency to blister and imparts a much longer useful life to the collar than when outer ply fabric of usual type is employed.

While in Fig. 6 the strand $b$ appears to form a substantial projection at the front face of the fabric, it is to be noted that this view is a diagrammatic view and to extremely large scale, and that in the actual fabric the use of such multi-strand yarns introduces no difficulty in obtaining the desired fine finish at the outer surface of the ply and in fact enhance those effects which are regarded as highly desirable by the trade.

A further and preferred construction is illustrated in Figs. 8 and 9. In this arrangement the facing ply or web F comprises filler yarns 16 which are of relatively large diameter, for example, 20's cotton and which, if desired, may be rather loosely spun. These filler yarns are associated with warp yarns 17 and 18 of normal type, hard spun, and of substantially smaller diameter than the filling yarns, for example, 40's cotton, the weave being, for example, plain with 136 warp ends and 60 filling ends per inch. The filling yarns 16 are beaten up so hard during weaving that they extend substantially straight from selvage to selvage without substantial crinkle, as indicated for example in Fig. 9, while the smaller warp yarns 17 and 18 are caused to be abnormally crinkled, as shown in Fig. 8, thus presenting very sharp curved bights of small radius where they cross the filling yarns and collectively substantially burying the latter, and giving the cloth a fine external appearance. It will also be noted, by reference to Fig. 9, that where the bights of the warp yarns 17 and 18 cross the filling yarn at the inner side of the ply, they contact the filling yarn over a very small area so that considerably more than 180° of the circumference of each warp yarn is exposed for free contact with the cementitious layer 6ᵃ. Thus this layer of adhesive substantially surrounds each such bight of warp yarn which in this respect may be likened to a knob-like projection at the rear surface of the facing ply, and these bights of the warp yarns thus embraced and embedded in the adhesive after the latter has set, form a positive anchorage for the facing ply, permanently uniting it to the interliner. Facing ply material of this type is wholly acceptable to the trade in so far as the appearance of its outer surface is concerned although its inner surface (speaking in terms of microscopic dimensions) is rough and covered with anchorage knobs and well calculated to provide a secure grip for the adhesive material.

The term "bight" as here used may be defined as one of the more or less U-shaped or horseshoe-shaped bends or elbows, whether plain or helical, made by a yarn of one set or by a strand of a multi-strand yarn where said yarn or strand curves about and partially embraces a yarn of the other set or another constituent strand of the multi-strand yarn, respectively, such bend closely and firmly engaging the yarn or strand which it partially embraces, and is to be distinguished from such loose projecting elements as long loops, floats, or nap fibers not constituting portions of the yarn essential to the integrity of the fabric structure.

While certain desirable embodiments of the invention have herein been illustrated and described by way of example, it is to be understood that these several embodiments are to be regarded as representative and emblematical of any appropriate arrangement whereby the rear surface of a facing ply fabric otherwise acceptable, so far as its outer surface appearance and finish is concerned, for use in the article or garment of which it is intended to form a constituent part, is provided at its inner side with a distinctly rough surface comprising knob-like or other projections either of microscopic or larger size about which the adhesive material of the interliner may flow so as to embrace, partially embrace or embed such projections or roughnesses, thereby to obtain a firm and positive and permanent grip such as securely to unite the facing ply to the interliner.

While it is obvious that it is more important that the facing ply be thus permanently and securely united to the interliner than that the rear ply should so be united, it is to be understood that, as illustrated for example in Fig. 8ᵃ the rear ply 5ᵈ may also, if desired, be similarly provided with an inner rough anchorage surface to insure perfect union with the interliner ply L. Moreover, it is to be understood that the only "interliner" may be a normally non-adhesive coating, layer, or deposit of the selected bonding medium applied directly to the inner surface of either or both facing or rear ply before assembly (such ply or plies having the characteristics above more fully described), in which event the completed collar would be a "two-ply" fused collar. Thus, as illustrated in Fig. 3ᵇ, the composite structure comprises the facing ply 4ᵐ and the rear ply 5ᵐ (one at least of which has a rough inner surface, as above described) directly united by the adhesive layer 6ᵐ. For more specific example, Fig. 8ᵇ shows a facing ply 4ⁿ and a rear ply 5ⁿ each of the general character of the facing ply F of Fig. 8 but directly united by the cementitious material 6ⁿ which obtains an encircling grip upon the projecting bights of the warp yarns of both the front and rear plies.

It is also to be recognized that while, as above described, the use of an interliner ply such as that disclosed in the Liebowitz patent is contemplated, and wherein such interliner ply comprises elements of natural textile material which maintain their integrity after the completion of the fusing operation, the invention is broadly inclusive of such other procedures and the use of such other interliners as may be useful in the manufacture of fused collars and including those modifications in which the entire interliner may be of fusible material; or wherein the opposed faces of the outer and inner plies and/or the interliner, may be coated with a continuous film or layer of thermoplastic bonding medium as more specifically described in the Swan application above referred to; or wherein the bonding medium may be disposed to form mere scattered dots or flattened globules carried by a foundation fabric of non-adhesive type; or in which the interliner, during the fusing operation loses its structural characteristics, constituting in effect merely a convenient supply of adhesive and leaving the finished collar or other article to consist, so far as actual fabric is concerned, merely of the facing and rear plies directly united by the interposed adhesive film. All such possible modifications and adaptations of the invention are to be regarded as within the purview of the invention, as defined in the appended claims.

We claim:

1. A moisture pervious fused collar of the kind which has facing and rear plies stiffened and united by an intermediate layer of textile lining material having incorporated therein spaced elements of a substance which is initially nonadhesive but which is inherently capable of being made adhesive, the facing ply comprising interwoven warp and weft yarns, characterized in that the weft yarns are of large diameter and are so beaten up during weaving as to form a close, dense fabric wherein the relatively small warp yarns are deeply crinkled and form sharp projecting bights where they cross the wefts, said projecting bights at the inner face of said ply constituting key elements which become embedded in the cementitious material and thereby afford a firm anchorage between said ply and the lining material.

2. A fused shirt collar including a dense outer woven textile web formed of warps approximating 40's single, cotton-count and wefts approximating 20's single, cotton-count, woven more or less approximately 136 warp ends and 60 filling picks per inch, a rear woven textile web and an intermediate woven web relatively less dense than said outer web and carrying a cementitious binding material uniting the aforementioned two other webs to form a composite collar structure, the exposed surface of said outer web being of a texture and appearance acceptable for its intended use, characterized in that the weft yarns of said outer web are so beaten up during weaving as to form a close dense fabric wherein the relatively small warp yarns are deeply crinkled and form sharp projecting bights where they cross the wefts, said projecting bights at the inner surface of said facing web constituting key elements which become embedded in the cementitious material and thereby afford a firm anchorage between said outer woven web and the intermediate woven web.

3. A moisture-pervious fused colar of the kind which has facing and rear webs of textile fabric, and a lining fabric including textile strands and a cementitious material, said cementitious material being initially nonadhesive but inherently capable of being made adhesive and of uniting and stiffening the facing and rear webs to form a composite collar structure, the facing web comprising a set of warp yarns interwoven with a set of weft yarns and having an outer surface which is commercially acceptable for use in collars and which is substantially free from cementitious material, the facing web being densely woven and being substantially thicker than the lining fabric, characterized in that the yarns of at least one of said sets are substantially coarser than 40's single, cotton-count, and are less deeply crinkled than those of the other set, the yarns of the latter set being relatively deeply crinkled thereby forming anchorage bights where they cross the yarns of the other set,—the yarn which constitutes each anchorage bight contacting but a small area of the yarn which it crosses so that a large part of the circumference of the bight-forming yarn at the crossing point is exposed to and held with an encircling grip by the cementitious material.

4. A fused collar of the kind which has facing and rear webs of woven textile fabric and a woven lining web which is relatively less dense than the facing web and which carries a cementitious binding material which is initially non-sticky but which is inherently capable of being made sticky and which unites the facing and rear webs to form a composite collar structure, the facing web being flexible and consisting of a set of warp yarns densely interwoven with a set of weft yarns, characterized in that the yarns of one of said sets, at least, are substantially coarser than 40's single, cotton count, the yarns of the two sets being so interwoven as to form a close dense fabric in which the bights of one set of yarns are sharper and of smaller radius than those of the other set of yarns, and at the inner surface of said facing web form key elements which are held in an encircling grip by the cementitious material.

5. A moisture-pervious fused collar of the kind which has facing and rear webs stiffened and united by an intermediate textile lining layer which comprises a substance that is initially non-adhesive but which is inherently capable of being made adhesive, the facing web comprising interwoven warp and weft yarns, characterized in that the weft yarns are of relatively large diameter and are so beaten up during weaving as to form a close dense fabric wherein the relatively small warp yarns are deeply crinkled and form sharp projecting bights where they cross the weft yarns, said projecting bights at the inner face of said web constituting key elements which become embedded in the cementitious material and thereby afford a firm anchorage between said web and the lining layer.

6. A moisture-pervious fused collar of the kind which has outer plies stiffened and united by an intermediate lining layer comprising a textile web and a cementitious substance, the latter being initially non-adhesive but inherently capable of being made adhesive,—one of the outer plies being densely woven fabric comprising warp yarns of approximately 40's single, cotton count, interwoven with weft yarns of substantially coarser count, characterized in that the weft yarns have relatively little crinkle,—being substantially straight, while the relatively small warp yarns are deeply crinkled and form sharp bights of small radius where they cross the weft yarns, said bights, at the inner surface of said outer ply, constituting key elements which are embedded in the cementitious material and thereby afford a firm anchorage between said outer ply and the lining layer.

7. A moisture-pervious fused collar of the kind which has facing and rear plies of flexible woven fabric stiffened and united by an intermediate lining layer which comprises a water-resistant cementitious substance, the exposed surface of the facing ply being of a texture which is commercially acceptable for its intended use, the said facing ply being a densely woven fabric in which the weft yarns are substantially coarser than 40's single, cotton count, there being approximately twice as many warp yarns as weft yarns per linear inch of fabric, the coarse weft yarns having relatively little crinkle and the warp yarns being relatively deeply crinkled and collectively forming a multitude of projecting bights where they cross the weft yarns,—said bights constituting key elements which are embedded in and held with an encircling grip by the cementitious substance.

THOMAS H. SWAN.
HARRY C. DONALDSON, Jr.